(12) United States Patent
Saka et al.

(10) Patent No.: US 6,884,386 B2
(45) Date of Patent: Apr. 26, 2005

(54) METHOD OF TOUGHENING AND MODIFYING CERAMIC AND CERAMIC PRODUCTS

(75) Inventors: Hiroyasu Saka, 5-53, Takazadai 1-chome, Kasugai-shi, Aichi-ken (JP); Syoji Uchimura, Nagoya (JP); Hideki Morimitsu, Shinshiro (JP)

(73) Assignees: Sintokogio, Ltd., Nagoya (JP); Sinto V-Cerax, Ltd., Toyokawa (JP); Hiroyasu Saka, Kasugai (JP)

( * ) Notice: Subject to any disclaimer, the term of this patent is extended or adjusted under 35 U.S.C. 154(b) by 0 days.

(21) Appl. No.: 10/381,016
(22) PCT Filed: Sep. 20, 2001
(86) PCT No.: PCT/JP01/08166
§ 371 (c)(1),
(2), (4) Date: Mar. 20, 2003
(87) PCT Pub. No.: WO02/24605
PCT Pub. Date: Mar. 28, 2002

(65) Prior Publication Data
US 2003/0162483 A1 Aug. 28, 2003

(30) Foreign Application Priority Data
Sep. 21, 2000 (JP) .................................. 2000-286442

(51) Int. Cl.$^7$ .......................... B24C 1/00; C04B 35/00
(52) U.S. Cl. .................. 264/678; 501/127; 501/97.1; 451/38; 451/39; 451/41
(58) Field of Search ................. 501/94, 1, 97.1, 501/127; 451/38–41; 264/678

(56) References Cited

U.S. PATENT DOCUMENTS 5,795,626 A * 8/1998 Gabel et al. ............... 427/458

FOREIGN PATENT DOCUMENTS

| JP | 61-168463 | | 7/1986 |
| JP | 4-275830 | * | 10/1992 |
| JP | 4-277594 | * | 10/1992 |
| JP | 05-200720 | | 8/1993 |
| JP | 05-238853 | | 9/1993 |
| JP | 6-335865 | * | 12/1994 |
| JP | 2001-181099 | | 7/2001 |

* cited by examiner

Primary Examiner—Karl Group
(74) Attorney, Agent, or Firm—Finnegan, Henderson, Farabow, Garrett & Dunner L.L.P.

(57) ABSTRACT

When a sintered body of ceramic is shot-blasted at normal temperatures to plastically deform the crystal structure of the shot-blasted surface to apply residual stress and is heat-treated to recrystallize fine cracks, dislocated cells in the grain boundary are formed, crystals are finely divided, and the fracture toughness is significantly improved. When the sintered body of ceramic is a thin product, an effective toughening can be attained by shot blasting both the front and back sides. After heat treatment, mechanical strength is significantly improved by removing a part of the modified surface layer by an abrasion treatment.

12 Claims, No Drawings

METHOD OF TOUGHENING AND MODIFYING CERAMIC AND CERAMIC PRODUCTS

This application is the national stage of International Application No. PCT/JP01/08166 filed Sep. 20, 2001, which is based upon and claims priority of Japanese patent application No. 2000-286442 filed Sep. 21, 2000.

TECHNICAL FIELD OF INVENTION

The present invention relates to a method of overcoming "fragility" in ceramic, which is the largest disadvantage for ceramic, and specifically relates to a method of significantly improving fracture toughness. More specifically the present invention relates to a method useful for significantly improving the mechanical properties of heat engine parts of gas turbines, automobiles, etc., mechanical structural element parts such as springs and gears, and sensors, actuators, and micromachine parts using a single-crystal material such as a silicon wafer, yttrium-aluminum-garnet (YAG), and sapphire, and a polycrystalline material such as barium titanate, and lead titanate zirconate (PZT), to increase their reliability, and relates to ceramic products produced by using the method.

DESCRIPTION OF RELATED ART

Generally ceramic members (products) are fragile and rigid materials. The fractural toughness of them is less than that of metals, and is a level of one-tenth to one-half of that of metals. Therefore ceramic is practically much lower in mechanical reliability compared with that of metals.

As the causes for the mechanical reliability of ceramic members (products) being quite low, the surface defect of them is exemplified. It is known that such a surface defect significantly affects mechanical properties. Usually a sintered body of ceramic has a surface defect, for various reasons (microcracks upon molding and drying, non-uniform shrinkage upon sintering, etc.). A surface defect sometimes becomes the origin of breakage. Thus it is desirable that the sintered body not have any surface defect. However, at present it is difficult to form a sintered body that has no surface defect. Also, it is very difficult to find such a fine defect by a non-destructive inspection.

In these circumstances, to increase mechanical reliability, methods for removing any surface defect have been conventionally adopted. That is, since upon preparing a sintered body of ceramic, by a method of preparing it the volumetric shrinkage cannot be avoided, and thus it has been difficult to prepare a sintered body having excellent dimensional accuracy, a sintered body obtained after sintering ceramic has been subjected to an abrading processing to remove any surface defect to improve dimensional accuracy. However, fine cracking can occur upon mechanical processing such as abrading. Also, the methods for mechanically removing a surface defect after sintering ceramic have problems such as that the processing cost is high.

As any other alternative method, a method of resintering a sintered body, i.e., conducting a high-temperature treatment to remedy a surface defect, is known. Although this method is effective for a sintered body of a non-oxide type material, on which an oxide layer is easily formed, no sufficiently improving effect can be obtained for a sintered body of an oxide-type material such as alumina or zirconia, on which an oxide layer can hardly be formed.

Also, a method was proposed of blast-processing with abrasive grains in the heated state a sintered body to a temperature such that the fracture toughness of it increases. By that method, although the surface is remedied no effect of modifying the fine structure of the crystals is obtained. Also, since for that method a sintered body should be blast-processed at such a high temperature it has disadvantages in that it is a difficult operation, and the cost is high.

On the other hand, a trial has been made to improve fracture toughness by improving the composition of a material. That is, a method of selecting an optimum aid for sintering and closely controlling the amount of the aid to be added, and a method of adding seed crystals to the material to control the fine structure of crystals, have been proposed. However, no sintered body of ceramic having a fracture toughness level of a metal (15 or more) has been found.

SUMMARY OF THE INVENTION

The present invention has been made in consideration of the problems of the conventional art as stated above. The object of the present invention is to provide a method of toughening and modifying ceramic and ceramic products, by which method the properties and reliability of the products are improved and specifically by which method the fracture toughness is greatly improved.

To achieve the above object (1) a method of toughening and modifying ceramic has been invented, said method being characterized by comprising a step of applying residual stress to a sintered body of ceramic by a shot-blasting treatment, a step of heat-treating the thus-obtained sintered body to recrystallize it, and a step of removing a part of the modified surface layer having dislocated cells obtained by the preceding steps.

Also, a method of toughening and modifying ceramic is within the scope of the present invention, said method being characterized by comprising (a) a step of applying a residual stress to a sintered body of ceramic by a shot-blasting treatment, (b) a step of heat-treating the sintered body treated by step (a) to recrystallize the part of ceramic near fine cracks, and (c) a step of removing from said sintered body heat-treated by step (b) a part of the modified surface layer, said layer having dislocated cells in the sintered body of ceramic.

Also within the scope of the present invention is a method of toughening and modifying ceramic characterized by comprising (a) a step of applying residual stress to a sintered body of ceramic by a shot-blasting treatment, or introducing a cell defect such as a dislocation by a plastic deformation, (b) a step of heat-treating the sintered body treated by step (a), to recrystallize the part of ceramic near fine cracks to form a sub-boundary, and (c) a step of removing from said sintered body having been heat-treated by step (b) a part of the modified surface layer of a sintered body of ceramic, said layer having dislocated cells.

The inventors of the present invention have found that the crystal structure of the surface of ceramic can be plastically deformed by shot blasting to apply residual stress to the structure. Also, the inventors have found that by heat-treating the sintered body of ceramic at a sintering temperature or less, the part of ceramic near fine cracks can be recrystallized to form dislocated cells at a grain boundary, to finely divide the recrystallized structure to significantly improve fracture toughness. Also, the inventors have found that, when the cracks are remedied by heat-treating the plastically deformed structure, the practical reliability of ceramic products can be significantly increased.

(2) Even if the sintered body is excessively plastically deformed by a shot-blasting treatment, it becomes easy to provide residual stress by blast-treating also the side opposite the side that has been blasted. In the blast-treating process both sides can be simultaneously blasted or each of both sides can be sequentially shot-blasted. Even if a part of a sintered body or a product is excessively plastically deformed, only that part may be blast-treated on both sides of that part.

(3) When the sintered body is a substrate, chip, thin sheet, foil, or flat plate, it is preferred that both sides of the sintered body be shot-blasted to apply residual stress to both sides.

(4) Also within the scope of the present invention is a method of toughening and modifying ceramic of any of Nos. (1) to (3), said method being characterized in that the temperature of the heat treatment is one at which cracks are remedied. Herein the temperature at which cracks are remedied is referred to as being a temperature at which a dislocation introduced near fine cracks is polygonized by a stabilization rearrangement to form a sub-boundary, as well as atoms near fine cracks being diffused to eliminate and remedy at least part of the fine cracks.

(5) Also within the scope of the present invention is a method of toughening and modifying ceramic of any of Nos. (1) to (4), in which method the step of removing a part of the modified surface layer is characterized by abrasion-treating from the outer surface the modified part wherein dislocated cells were obtained by a shot-blasting treatment and heat treatment (to a depth of several micrometers to several hundred micrometers). As abrasion treatment methods, barrel polishing, buffing, honing, and polishing are exemplified; however, any abrading method can be used. An abrading method is selected depending on the kind of product, etc.

(6) Ceramic products (including ceramic parts and members) produced by a method of toughening and modifying ceramic of any of Nos. (1) to (5) are within the scope in the present invention. Those products have improved properties of some of fracture toughness, wear resistance, fatigue strength, resistance to thermal shock, and resistance to thermal fatigue.

(7) Also, within the scope of the present invention is a method of toughening and modifying ceramic and ceramic products (including ceramic parts and members), said method being characterized by comprising (a) a step of subjecting the sintered body of ceramic to a shot-blasting treatment with shot consisting of fine particles having an average particle diameter of 100 $\mu$m or less to apply residual stress to the sintered body, and (b) a step of heat-treating the sintered body treated by step (a), to recrystallize the part of ceramic near fine cracks.

Also, within the scope of the present invention is a method of toughening and modifying ceramic and ceramic products (including ceramic parts and members), said method being characterized by comprising (a) a step of subjecting the sintered body of ceramic to a shot-blasting treatment with shot consisting of fine particles having an average particle diameter of 100 $\mu$m or less to apply residual stress to the sintered body, or of plastically deforming the sintered body to introduce a cell defect such as dislocation, and (b) a step of heat-treating the sintered body treated by step (a) to recrystallize the part of ceramic near fine cracks to form a sub-boundary.

DETAILED DESCRIPTION OF THE INVENTION

The ceramic materials used in the present invention include silicon nitride, silicon carbide, alumina ceramic; and single-crystal materials such as silicon, yttrium-aluminum-garnet, gallium arsenide, silicon germanium, sapphire, and a single-crystal alumina; and polycrystalline materials such as barium titanate, lead titanate zirconate (PZT), and aluminum nitride. The ceramic products (including ceramic parts and members) of the present invention include mechanical structural element parts such as springs, knife edges, gears and bearings; heat engine parts such as automotive engine valves and blades of gas turbines; and semiconductor elements, sensor elements, piezoelectric elements, micromachine parts, semiconductor substrates, substrates of electronic parts, etc., using a single crystal material or polycrystalline material. The present invention is particularly effective in improving mechanical properties of thin parts such as sensors and semiconductor substrates.

Step (a) is a step of a shot-blasting treatment of the sintered body of ceramic. The plastic deformation is in connection with shot blast conditions, particularly the hardness of shot, the particle diameter of shot, and projection energy such as impact speed, and significantly depends on kinetic energy at the impact of shot.

Also, when the conditions for the heat treatment of step (b), and conditions for the removal of a part of the modified surface layer of the product surface of step (c), e.g., conditions for the abrading treatment, are properly selected, the strength and fracture toughness of a sintered body can be significantly improved compared with those in the case where the sintered body of ceramic is not treated by the method of the present invention. When fracture toughness is improved, a synergistic effect is obtained such that resistance to thermal shock, resistance to thermal fatigue, wear resistance properties, etc., are secondarily significantly improved.

The major steps of the production process of ceramic products of the present invention are now shown: Adjustment of materials→molding→processing→degreasing→sintering→(machining→) a shot-blasting treatment→heat treatment→an abrading treatment→products. Herein, machining is optionally conducted.

The conditions for the shot-blasting treatment are selected such that stress is applied that is equivalent to or more than the stress used in the loaded state that is the same as the state in which the product is used, to set up residual compression stress to the surface layer. In the area to which residual compression stress is applied, remedying of cracks is accelerated and particularly fatigue strength is improved.

When intended products are thin elements, a substrate, etc., they are sometimes plastically deformed excessively so that residual stress can hardly be applied, depending on the conditions for a blast treatment. In such a case optimization of the conditions for the blast treatment is of course important; however, residual stress may be effectively applied simply by a blast treatment on both sides of a sintered body. That is, even if a sintered body is excessively deformed, residual stress can be easily applied by blast-treating both sides of the body.

Although the proper temperatures for the heat-treatment are varied depending on the kinds of materials, they are those at which recrystallization starts (e.g., sintering temperatures, temperatures that are one half of or more than the temperatures at which coagulation starts), and specifically suitable are those in the range of 1,000° C. to 1,600° C. The heat treatment should be conducted in atmosphere, under vacuum, or in an inert gas. Particularly when it is conducted in atmosphere the strength-improving effect is high.

When a heat treatment is conducted after shot blasting, the surface layer is plastically deformed to form a dislocated cell structure to form a surface layer comprised of fine crystals by a static recrystallization. It is recognized that such a deforming of a surface layer improves not only fracture toughness and strength but also mechanical properties such as fatigue strength and wear resistance, resistance to thermal shock, and resistance to thermal fatigue. A dislocated cell is formed primarily by a plastic deformation and secondarily by a heat treatment.

The effects obtained by the shot blasting and heat treatment are seen in the depth direction of only dozens of $\mu$m to several hundred $\mu$m. However, when the process of the present invention is applied to a thin substrate having a thickness of several hundred $\mu$m, significant effects can be obtained.

Since the blasting and heat treatments form concave and convex scars from traces of strikes and an oxide layer on a surface, an abrading treatment is conducted in order to remove a part of the modified surface layer. The thickness of the modified surface layer in which a dislocated cell is formed is from dozens of $\mu$m to several hundred $\mu$m. Accordingly the thickness to be removed for a rough surface layer and oxide layer should have an optimum value. This is because if the modified surface layer were to be entirely removed the toughening effect would be lost. The thickness of the layer to be removed is preferably to be at a level such that the irregular surface resulting from the blast treatment becomes even, that is, to be within a level of several $\mu$m to several hundred $\mu$m, more preferably about 5 $\mu$m to about 20 $\mu$m. However, when fine particles of 100 $\mu$m or less are used as shot, a treated surface without concave and convex scars from traces of strikes is obtained. Further, when a material is used in which production of an oxide layer in the subsequent heat treatment does not affect it or in a condition under which no oxide layer is formed, then even if an abrading treatment step is omitted a toughened and modified sintered body can be obtained.

Fracture toughness means resistance to elongation of cracks. As measures of fracture toughness, physical quantities are used, such as fracture toughness value (K1C), hardness, and Young's modulus. Hardness, which can be measured most easily, is preferably used as the measure.

Shot used for the shot-blasting treatment of step (a) include, for example, mullite, SiC, carbide alumina, zirconia, and glass. Each particle of shot preferably should take the shape of a sphere as much as possible since then it does not undesirably damage a substance to be treated. A shot is selected and used depending on the materials and hardness of the sintered body of ceramic. To impact shot on a surface of sintered body, any of shot blasting, air blasting, and liquid honing can be utilized.

In an air-blasting treatment, air or an inert gas is used as a medium. In a liquid-honing treatment, water is usually used as a medium.

The conditions for a shot-blasting treatment depend on the hardness of the shot, particle diameter, impact speed, etc., and significantly depend on the kinetic energy at the time of the impact of particles. The kinetic energy that particles have is converted to plastic deformation, elastic deformation, and fracture energy of the substance to be treated or particles, and frictional energy between a substance to be treated and particles, etc. In any blast treatment method, the conditions should be set such that the kinetic energy applied to the substance to be treated is the maximum. For that reason it is important to project particles perpendicularly to the sub stance to be treated. Also, a preferable shot-blasting treatment should reduce irregularities on a surface layer, i.e., roughness of the surface, and increase the thickness of the plastically deformed layer (residual stress-applied layer), and for such a preferable shot-blasting treatment the optimum conditions for each material should be selected.

EFFECTS OF THE INVENTION

According to the present invention mentioned in (1) above, toughening ceramic with simplicity and excellent economy compared with conventional methods is realized. That is, toughening ceramic can be realized by a step of shot blasting the sintered body of ceramic to make it plastically deformed so as to apply residual stress to the surface structure of the sintered body, a step of heat treatment, and a step of an abrading treatment so as to flatten the surface in which fine cracks are recrystallized.

According to the present invention mentioned in (2) above, by shot blasting both sides appropriate residual stress can be applied to the sintered body, as well as modifying the deformation of the sintered body of ceramic.

As in the present invention mentioned in (3) above, the present invention is suitable for improving the toughness of ceramic parts used for functional materials for a substrate of thin film, sensors, etc.

Also, according to the present invention mentioned in (4) above, since a heat treatment is conducted at a temperature at which cracks are remedied, the heat treatment of this invention allows the part of ceramic near fine cracks to be recrystallized, and thus it reduces the fine cracks in the surface structure. Thereby the cracks are remedied and thus the sintered body is toughened.

Since, according to the present invention mentioned in (5) above on the modified surface having dislocated cells that have been formed by steps (a) and (b) concave and convex scars of traces from strikes and an oxide layer are abraded, the mechanical properties of ceramic products are improved.

Also, according to the present invention mentioned in (7), when as a particle for a shot-blasting treatment, fine particles, preferably particles having an average particle diameter of 100 $\mu$m or less, are used, a surface without concave and convex scars of traces from strikes can be obtained, and thus the removal of a part of the modified surface layer is unnecessary.

As is clear from the above, since, according to the present invention, wherein a process of heat-treatment is carried out after shot-blasting the sintered body of ceramic at normal temperatures, recrystallizing the part of the ceramic near fine cracks occurs by the heat treatment after plastically deforming the crystal structure of the surface of the sintered body to apply residual stress, dislocated cells are formed in the grain boundary, and the sizes of the crystals are minimized to significantly improve fracture toughness. By removing a part of the modified surface layer after the heat treatment, the mechanical strength of the sintered body is significantly improved.

EXAMPLES

Evaluation Methods

First, the evaluation methods in the Examples will be specifically explained.

Following the Japan Industrial Standards, test specimen materials were subjected to a mechanical processing into a size of 3 mm×4 mm×40 mm to make test pieces for bending tests. Bending tests were conducted following JIS-R-1601 (a three-point bending test). Also, fracture toughness values were determined by measuring the length of a crack made by a Vickers indenter with a Vickers hardness tester varying indentation load conditions. That is, following JIS-R-1607, fracture toughness tests (IF method) were conducted to determine them.

The optimum value of the indentation load condition was selected depending on the kind of material and set to be 1 kgf, 2 kgf, 5 kgf, or 10 kgf. The time for retaining a load was set at 20 seconds. The conditions were set such that the temperature of the heat treatment was 1,200° C. to 1,400° C., retention time one hour, and the condition of the atmosphere was in atmosphere or under vacuum and the rate of temperature rise was 10° C./minute. When silicon nitride is heated to 1,000° C. or more in atmosphere, oxidation proceeds; however, the oxidation level does not affect the properties of materials provided that the temperature of the heating is 1,300° C. or less. When any problem occurs, a heating treatment may be conducted in a nitrogen gas or inert gas. The evaluations of fracture toughness were conducted using as test pieces for evaluation those that were mirror-polished such that the surface roughness was 0.2S or less, by abrading the surfaces of the test pieces sequentially with diamond-abrasive papers of #600, #1000 and #3000. Plastic deformation was determined by measuring by a laser microscope the maximum deformation of the test pieces in the convex state.

Test Specimens

The test specimens below were used in each Example.

Test specimen No. 1: an alumina ceramic material (alumina purity: 92%)

Test specimen No. 2: an alumina ceramic material (alumina purity: 99.5%)

Test specimen No. 3: an alumina ceramic material (alumina purity: 99.99%)

Test specimen No. 4: a silicon nitride ceramic material (silicon nitride (Refercerm SN1, prepared by Japan Fine Ceramic Center: aid for sintering (Ce+MgO) type)

Test specimen No. 5: silicon nitride (prepared by SINTO V-CERAX, LTD.: aid for sintering (Y2O3+Al2O3) type)

Test specimen No. 6: an aluminum nitride material (aid for sintering (Y2O3) type)

Test specimen No. 7: silicon wafer

Test specimen No. 8: single crystal alumina

Example 1

Conditions for Shot-blasting Treatments and Toughening Effects

Using Test specimen No. 2 (alumina: 99.5%) and Test specimen No. 5 (silicon carbide), test pieces (size: 5 mm width×80 mm length×0.3 mm thickness) were prepared. When one side of a surface of 5 mm×80 mm surface was blast-treated from the vertical direction to that side (in the direction of thickness) and when both sides of those surfaces of 5 mm×80 mm surfaces were blast-treated, plastic deformation and fracture toughness levels obtained after the test pieces were heat-treated were compared. Their results are shown in Table 1. As conditions for the shot blasting, atmospheric condition, and as the shots, two types of particles, mullite particles (Cerabeads 60, #1700: prepared by Naigai Ceramics Co. Ltd.) and carbide particles (ST-160, prepared by SINTOBRATOR, LTD.), were selected. For mullite particles the treatment was conducted using pressure shot-blasting equipment (produced by SINTOBRATOR, LTD.) under conditions such that the pressure for the projection was 1.0 kg/cm$^2$, and the nozzle diameter for the projection was 6 $\phi$. For carbide particles the treatment was conducted using gravity shot-blasting equipment (produced by SINTOBRATOR, LTD.) under conditions such that the pressure of the projection was 2.0 kg/cm$^2$, and the nozzle diameter for projection was 8 $\phi$. The blasting times were 30 seconds to 60 seconds. Heat treatments were conducted in atmosphere at 1,300° C. for one hour.

TABLE 1

Results of Comparison of Improved Effects in Fracture Toughness under Shot-blasting Treatment Conditions

| Test Specimen No. | Kind of Shot Material | Shot Duration (Seconds) | Shot Side | Surface Roughness (Rmax: μm) | Plastic Deformation before Heat Treatment *1 (mm) | Plastic Deformation after Heat Treatment *1 (mm) | Fracture Toughness Value KIC (Mpa · ½) | Improved Effect in Fracture Toughness (Comparison of Effect with Untreated) |
|---|---|---|---|---|---|---|---|---|
| 5 | | Untreated | | 0.2 | No Deformation | No Deformation | 6.48 | 1.00 |
| | Cerabeads | 30 | One Side | 20 | 0.51 | 5.03 | 6.95 | 1.07 |
| | Cerabeads | 60 | One Side | 25 | 0.75 | 7.63 | 7.18 | 1.11 |
| | Cerabeads | 90 | One Side | 30 | 0.73 | 7.34 | 7.24 | 1.12 |
| | Super hard shot | 30 | One Side | 5 | 0.83 | 9.24 | 7.29 | 1.12 |
| | Super hard shot | 60 | One Side | 5 | 1.24 | 10.32 | 7.31 | 1.13 |
| | Cerabeads | 30 | Both Sides | 20 | No Deformation | No Deformation | 7.58 | 1.16 |
| | Cerabeads | 60 | Both Sides | 25 | No Deformation | No Deformation | 8.37 | 1.29 |
| | Cerabeads | 80 | Both Sides | 30 | No Deformation | No Deformation | 8.25 | 1.27 |
| | Super hard shot | 30 | Both Sides | 5 | No Deformation | No Deformation | 9.34 | 1.44 |
| | Super hard shot | 60 | Both Side | 5 | No Deformation | No Deformation | 10.58 | 1.63 |
| 2 | | Untreated | | 0.2 | No Deformation | No Deformation | 3.02 | 1.00 |
| | Cerabeads | 30 | One Side | 13 | 0.21 | 2.43 | 3.19 | 1.06 |
| | Cerabeads | 90 | One Side | 17 | 0.27 | 2.57 | 4.55 | 1.51 |
| | Cerabeads | 30 | Both Sides | 13 | No Deformation | No Deformation | 4.88 | 1.62 |
| | Cerabeads | 90 | Both Sides | 17 | No Deformation | No Deformation | 5.40 | 1.79 |

*1 Heat Treatment Temperature: 1300° C.

From the results of Table 1 it is seen that toughening effects significantly vary depending on the material of the ceramic and the material of the shot. Also it is seen that plastic deformations significantly vary depending on the conditions for blast treatments. Also, it is seen that when blast treatments are applied to both sides higher effects are obtained. It can be recognized that when a blast treatment is conducted on only one side, lower effects are obtained, while when it is conducted on both sides, higher effects are obtained. It can be recognized that this is because when both sides were blast-treated residual stress is easily applied while when only one side is blast-treated residual stress hardly remains due to plastic deformation.

Example 2

Conditions for a Heat Treatment of Polycrystalline Materials and the Improved Effects in Fracture Toughness Six kinds of test specimens, Nos. 1–6, were evaluated. Following the Japan Industrial Standards, test specimens were subjected to a mechanical processing into a size of 3 mm×4 mm×40 mm to make test pieces for a bending test. Only one side of the surfaces, 4 mm×40 mm, was blast-treated in the direction of the thickness of the test pieces (3 mm). Thereafter heat treatments were conducted in atmosphere followed by an abrading treatment, to have samples be evaluated. The results are shown in Table 2.

TABLE 2

Improved Effects in Fracture Toughness of Each Polycrystalline Material

| Test Specimen No. | Blast Treatment Condition Shot Material; Shot Duration | Heat Treatment Condition Treatment Temperature (° C.) | Fracture Toughness KIC (MPa · m$^{1/2}$) | Improved Effect in Fracture Toughness (Comparison of Effect with Untreated) |
|---|---|---|---|---|
| 1 | Untreated | Untreated | 2.46 | 1.00 |
|   | Untreated | 1300 | 3.65 | 1.18 |
|   | Cerabeads; 30 sec. | 1300 | 4.55 | 1.85 |
|   | Cerabeads; 30 sec. | 1300 | 3.34 | 1.36 |
|   | Super Hard; 50 sec. | 1300 | 4.00 | 1.64 |
|   | Super Hard; 50 sec. | 1400 | 4.63 | 1.88 |
| 2 | Untreated | Untreated | 3.02 | 1.00 |
|   | Untreated | 1300 | 3.34 | 1.11 |
|   | Cerabeads; 30 sec. | 1300 | 3.19 | 1.06 |
|   | Cerabeads; 60 sec. | 1300 | 4.55 | 1.61 |
|   | Super Hard; 60 sec. | 1300 | 5.45 | 1.80 |
|   | Super Hard; 60 sec. | 1400 | 5.65 | 1.87 |
| 3 | Untreated | Untreated | 3.02 | 1.00 |
|   | Untreated | 1200 | 3.19 | 1.06 |
|   | Cerabeads; 60 sec. | 1200 | 4.34 | 1.44 |
| 4 | Untreated | Untreated | 5.93 | 1.00 |
|   | Untreated | 1200 | 9.67 | 1.63 |
|   | Untreated | 1300 | 6.69 | 1.13 |
|   | Cerabeads; 30 sec. | 1300 | 9.51 | 1.60 |
|   | Cerabeads; 60 sec. | 1200 | 9.14 | 1.54 |
|   | Cerabeads; 90 sec. | 1300 | 15.16 | 2.56 |
|   | Super Hard; 60 sec. | 1300 | 10.65 | 1.80 |
| 5 | Untreated | Untreated | 6.49 | 1.00 |
|   | Untreated | 1200 | 8.15 | 1.26 |
|   | Untreated | 1300 | 6.02 | 0.93 |
|   | Cerabeas; 30 sec. | 1200 | 7.62 | 1.17 |
|   | Super Hard; 60 sec. | 1300 | 8.08 | 1.24 |
|   | Super Hard; 60 sec. | 1400 | 10.54 | 1.62 |
| 6 | Untreated | Untreated | 2.16 | 1.00 |
|   | Cerabeas; 60 sec. | 1200 | 2.84 | 1.32 |

It is seen that at temperatures of the heat treatment of 1,200° C. or more, fracture toughness is significantly higher than for an untreated sintered body. Particularly in the case of silicon nitride (Test specimen No. 4), the fracture toughness (K1C) was 15 MPa·m$^{1/2}$ (when Cerabeads were used for 60 seconds, and at 1,300° C.) and 2.6 times the fracture toughness of an untreated sintered body. That fracture toughness level corresponds to that for cast iron, which no ceramic has ever before attained.

Example 3

Conditions for Heat Treatment in Single Crystal Materials and Improved Effects in Fracture Toughness A silicon wafer (Test specimen No. 7) and single crystal alumina (Test specimen No. 8), both of which were single crystal materials, were used. The size for test specimens was 10 mm×10 mm×1.0. One side of the surfaces, of 10 mm×100 mm, was blast-treated in the direction of the thickness. Heat treatments were conducted under vacuum for the silicon wafer and in atmosphere for the single crystal alumina, followed by an abrading treatment to make test pieces of which the fracture toughnesses were evaluated. The results are shown in Table 3.

TABLE 3

Improved Effects in Fracture Toughness of Single Crystal Materials

| Test Specimen No. | Blast Treatment Condition Shot Material; Shot Duration | Heat Treatment Condition Treatment Temperature (° C.) | Fracture Toughness KIC (MPa · m$^{1/2}$) | Improved Effect in Fractures Toughness (Comparison of Effect with Untreated) |
|---|---|---|---|---|
| 7 | Untreated | Untreated | 0.91 | 1.00 |
|   | Untreated | 1200 | 0.98 | 1.08 |
|   | Cerabeads; 5 sec. | 1200 | 1.24 | 1.36 |
|   | Cerabeads; 10 sec. | 1200 | 1.09 | 1.20 |
|   | Cerabeads; 15 sec. | 1200 | 1.03 | 1.13 |
|   | Cerabeads; 15 sec. | 1300 | 1.53 | 1.68 |
|   | Cerabeads; 15 sec. | 1400 | 1.89 | 2.07 |
| 8 | Untreated | Untreated | 0.91 | 1.00 |
|   | Untreated | 1300 | 1.37 | 1.50 |
|   | Cerabeads; 30 sec. | 1300 | 3.70 | 4.05 |
|   | Cerabeads; 30 sec. | 1400 | 3.65 | 4.00 |

The fracture toughness obtained by a heat treatment at 1,200° C. or more is recognized as being significantly high compared with an untreated sintered body.

Example 4

Improved Effects in Strength Obtained by an Abrading Treatment

The bending strengths were compared for samples to which after a heat treatment no abrading treatment was applied and samples to which abrading treatments were applied after a heat treatment. The results are shown in Table 4.

TABLE 4

Improved Effects in Strength by Abrading Treatment after Blast and Heat Treatments

| Test Speci-men No. | Blast Treatment Condition Shot Material; Shot Duration | Heat Treatment Condition Treatment Temperature (° C.) | Grinding Treatment Yes or No | Flexural Strength MPa | Improved Effect in Flexural Strength Comparison of Strength with Untreated |
|---|---|---|---|---|---|
| 1 | Untreated | Untreated | No | 362 | 1.00 |
|   | Cerabeads; 60 sec. | 1300 | No | 353 | 0.98 |
|   | Cerabeads; 60 sec. | 1300 | Yes | 384 | 1.06 |
| 2 | Untreated | Untreated | No | 406 | 1.00 |
|   | Cerabeads; 60 sec. | 1300 | No | 372 | 0.92 |
|   | Cerabeads; 60 sec. | 1300 | Yes | 449 | 1.11 |
| 4 | Untreated | Untreated | No | 871 | 1.00 |
|   | Cerabeads; 60 sec. | 1300 | No | 573 | 0.77 |
|   | Cerabeads; 60 sec. | 1300 | Yes | 896 | 1.03 |
| 5 | Untreated | Untreated | No | 751 | 1.00 |
|   | Cerabeads; 60 sec. | 1300 | No | 727 | 0.97 |
|   | Cerabeads; 60 sec. | 1300 | Yes | 810 | 1.08 |
| 6 | Untreated | Untreated | No | 386 | 1.00 |
|   | Cerabeads; 60 sec. | 1300 | No | 344 | 0.89 |
|   | Cerabeads; 60 sec. | 1300 | Yes | 395 | 1.02 |

From Table 4 it is seen that although the samples to which a blast treatment and heat treatment had been applied have lower strengths compared with samples to which no treatment had been conducted (untreated), when an abrading treatment is conducted for the former samples the strengths recover. Before the abrading treatment, shot is projected through a surface and into the sintered body, and scars were observed. The scars significantly affect bending strengths, and the strengths are significantly improved by the abrading treatment. The projecting-through of shot may be avoided by the projection of fine shot before heat treatment.

Example 5

Optimum Values in Depth Direction and the Width Removed by Abrading for Toughening and Modifying Effects A modified surface layer is formed on a surface of the sintered body of ceramic by a shot-blasting treatment followed by a heat treatment. When the modified surface layer is abraded, bending strength increases; however, if the width removed by the abrading is large, the effects obtained by the above treatments are lost. Accordingly fracture toughness values were determined for samples in which the widths removed by abrading are changed and the relationship was examined between the abraded depths and the modified effects. The results are shown in Table 5.

TABLE 5

Effects in Depth Direction in Toughening and Modifying Effects

| Test Specimen No. | Blast Treatment Condition Shot Material; Shot Duration | Heat Treatment Condition Treatment Temperature (° C.) | Width Removed by Grinding (μm) | Fracture Toughness KIC (MPa · m$^{1/2}$) | Improved Effect in Flacture Toughness (Comparison of Effect with Untreated) |
|---|---|---|---|---|---|
| 5 | Untreated | Untreated | | 6.49 | 1.00 |
| | Cerabeads; 60 sec. | 1300 | 5 | 8.53 | 1.31 |
| | Cerabeads; 60 sec. | 1300 | 10 | 8.32 | 1.28 |
| | Cerabeads; 60 sec. | 1300 | 15 | 8.45 | 1.30 |
| | Cerabeads; 60 sec. | 1300 | 20 | 8.08 | 1.24 |
| | Cerabeads; 60 sec. | 1300 | 25 | 6.55 | 1.01 |
| 2 | Untreated | Untreated | | 3.02 | 1.00 |
| | Cerabeads; 60 sec. | 1300 | 5 | 5.45 | 1.80 |
| | Cerabeads; 60 sec. | 1300 | 10 | 6.42 | 1.79 |
| | Cerabeads; 60 sec. | 1300 | 15 | 6.48 | 1.81 |
| | Cerabeads; 60 sec. | 1300 | 20 | 3.55 | 1.18 |

When the width removed by abrading increases to some extent, a fracture toughness level does not change, but rather remains the same as the level obtained where the sintered body is untreated. From that result it is found that there is an optimum level of the width to be removed by abrading. For example, for the conditions for the treatments shown in Table 5, for test specimen No. 5, the removal in a width of 5 μm to 20 μm is optimum. Also, for test specimen No. 2, the removal of a width of 5 μm to 20 μm is optimum.

Example 6

Effects Obtained by Using Fine Particles as Shot

Test pieces for a bending test by JIS were made. Blast treatments were conducted for these test pieces using zirconia beads having an average particle diameter of 50 μm followed by a heat treatment at 1300° C. for one hour. The surface roughness of the surface treated before and after a blast treatment, and the bending strengths obtained with an abrading treatment or without an abrading treatment, were determined. The results are shown in Table 6.

TABLE 6

Effects on Shot Material Having Fine Particle Sizes
(Omission of Process of Removing Modified Surface Layer by Grinding)

| Test Specimen No. | Blast Treatment Condition Shot Material; Shot Duration | Heat Treatment Condition Treatment Temperature (° C.) | Surface Roughness R max; μm Before Blasting | Surface Roughness R max; μm After Blasting | Width Removed by Grinding (μm) | Flexural Strength MPa | Improved Effect In Flexural Strength (Comparison of Strength with Untreated) |
|---|---|---|---|---|---|---|---|
| 5 | Untreated | Untreated | 0.20 | | | 871 | 1.00 |
| | Zirconia Beads; 60 sec. | In Nitrogen Gas; 1300 | 0.20 | 0.22 | 0 | 889 | 1.02 |
| | Zirconia Beads; 60 sec. | In Nitrogen Gas; 1300 | 0.20 | 0.22 | 5 | 893 | 1.03 |
| | Zirconia Beads; 60 sec. | In Nitrogen Gas; 1300 | 0.20 | 0.23 | 10 | 887 | 1.02 |
| 2 | Untreated | Untreated | 0.20 | | | 406 | 1.00 |
| | Zirconia Beads; 60 sec. | 1300 | 0.20 | 0.25 | 0 | 435 | 1.07 |
| | Zirconia Beads; 60 sec. | 1300 | 0.20 | 0.24 | 5 | 441 | 1.09 |
| | Zirconia Beads; 60 sec. | 1300 | 0.20 | 0.25 | 10 | 439 | 1.08 |

No significant difference was found in the surface roughness before and after a shot blasting with shot having fine particle diameters. That fact shows a surface without concave and convex scars from traces from strikes was obtained. Also, from the results of the determination of bending strength it was found that in such a shot-blasting condition, without an abrading treatment strength is improved, and thus the process of the abrading treatment can be omitted. No significant difference was found in the fracture toughness levels K1C with or, without an abrading treatment, although Table 6 does not refer to this. The fracture toughness levels of the treated products were improved compared with those of the untreated products.

What is claimed is:

1. A method of toughening and modifying ceramic comprising a step of applying residual stress to a sintered body of ceramic by a shot-blasting treatment, a step of heat-treating the resulting sintered body to recrystallize it, and a step of removing a part of a modified surface layer having dislocated cells resulting from the two preceding steps.

2. A method of toughening and modifying ceramic comprising (a) a step of applying residual stress to a sintered body of ceramic by a shot-blasting treatment, (b) a step of heat-treating the sintered body treated by step (a) to recrystallize ceramic near fine cracks, and (c) a step of removing a part of a modified surface layer having dislocated cells of the sintered body of ceramic heat-treated by step (b).

3. A method of toughening and modifying ceramic comprising (a) a step of applying residual stress or of introducing a cell defect to a sintered body of ceramic by a shot-blasting treatment, (b) a step of heat-treating the sintered body treated by step (a) to recrystallize a part of ceramic near fine cracks to form a sub-boundary, and (c) a step of removing a part of a modified surface layer having dislocated cells of the sintered body of ceramic heat-treated by step (b).

4. A method of toughening and modifying ceramic of any one of claims 1–3 wherein a shot-blasting treatment is applied to opposing sides of the sintered body.

5. A method of toughening and modifying ceramic of any one of claims 1–3 wherein the sintered body is a substrate, tip, thin film, foil, or flat plate.

6. A method of toughening and modifying ceramic of any one of claims 1–3 wherein the temperature of the heat treatment is the temperature at which cracks are remedied.

7. A method of toughening and modifying ceramic of any one of claims 2 or 3 wherein step (c) is a step of removing by abrading from the outer surface the modified surface layer to a depth of several $\mu$m to several hundred $\mu$m.

8. A method of toughening and modifying ceramic comprising (a) a step of applying residual stress to a sintered body of ceramic by a shot-blasting treatment with fine particles having an average particle diameter of 100 $\mu$m or less, and (b) a step of heat treating the sintered body treated by step (a) to recrystallize a part of ceramic near fine cracks generated by the shot-blasting treatment.

9. A method of toughening and modifying ceramic characterized by comprising (a) a step of applying residual stress or of introducing a cell defect to a sintered body of ceramic by a shot-blasting treatment with fine particles having an average particle diameter of 100 $\mu$m or less, and (b) a step of heat-treating the sintered body treated by step (a) to recrystallize a part of ceramic near fine cracks generated by the shot-blasting treatment to form a sub-boundary.

10. A method of toughening and modifying ceramic of claim 8 or claim 9 wherein the shot-blasting treatment is applied to opposing sides of the sintered body.

11. A method of toughening and modifying ceramic of claim 8 or 9 wherein the sintered body is a substrate, tip, thin film, foil, or flat plate.

12. A method of toughening and modifying ceramic of claim 8 or 9 wherein the temperature of the heat treatment is the temperature at which cracks are remedied.

* * * * *